United States Patent [19]

Schweiss et al.

[11] Patent Number: 4,477,341
[45] Date of Patent: Oct. 16, 1984

[54] INJECTOR APPARATUS HAVING A CONSTRICTION IN A FOLLOWING ADJOINING MIXING PIPE

[75] Inventors: Peter Schweiss, Elchingen; Hans-Dieter Dorflinger, Heidenheim, both of Fed. Rep. of Germany

[73] Assignee: J. M. Voith GmbH, Heidenheim, Fed. Rep. of Germany

[21] Appl. No.: 439,029

[22] Filed: Nov. 4, 1982

[30] Foreign Application Priority Data

Nov. 7, 1981 [DE] Fed. Rep. of Germany ....... 3144386

[51] Int. Cl.³ .............................................. B03D 1/24
[52] U.S. Cl. ................................ 209/170; 210/221.2; 261/123; 261/DIG. 75
[58] Field of Search ............... 209/162, 163, 164, 168, 209/170; 210/221.1, 221.2; 261/DIG. 75, 123

[56] References Cited

U.S. PATENT DOCUMENTS

| | | | |
|---|---|---|---|
| 1,279,040 | 9/1918 | Thomas | 209/170 |
| 3,342,331 | 5/1965 | Maxwell | 209/170 |
| 3,640,516 | 2/1972 | Willinger | 261/DIG. 75 |
| 3,722,679 | 3/1973 | Logue | 209/164 |
| 4,110,210 | 8/1978 | Degner | 210/221.2 |
| 4,162,972 | 7/1979 | Green | 261/DIG. 75 |
| 4,179,375 | 12/1979 | Smith | 261/DIG. 75 |
| 4,198,359 | 4/1980 | Todd | 261/123 |
| 4,255,262 | 3/1981 | O'Cheskey | 210/221.2 |
| 4,267,052 | 5/1981 | Chang | 261/DIG. 75 |

FOREIGN PATENT DOCUMENTS 2634496 2/1978 Fed. Rep. of Germany .
342528 4/1978 Fed. Rep. of Germany .

Primary Examiner—Tim Miles
Attorney, Agent, or Firm—Albert L. Jeffers; Douglas L. Miller

[57] ABSTRACT

The injector apparatus is of the kind having a constriction which lies, in the flow direction, immediately before a following adjoining mixing section, in which fibrous stock suspension is mixed with air for the purpose of subjecting the suspension to flotation in a flotation tank. The mixing pipe in which the mixing section is disposed has a radial diffusor at its outlet end, and, for a greater flow rate of air, additional air intake bores are disposed therein a short distance in the flow direction after the constriction.

A favorable arrangement is achieved if the injector apparatus with the mixing pipe is arranged perpendicularly in a flotation tank, which may have the form of a reclining cylinder. In this case, the froth, like the cleaned suspension, is drawn off on one long side, i.e., a side which extends parallel to the cylinder axis; the extraction opening for the cleaned suspension being provided preferably immediately below the level of the suspension and/or the froth extraction arrangement.

22 Claims, 11 Drawing Figures

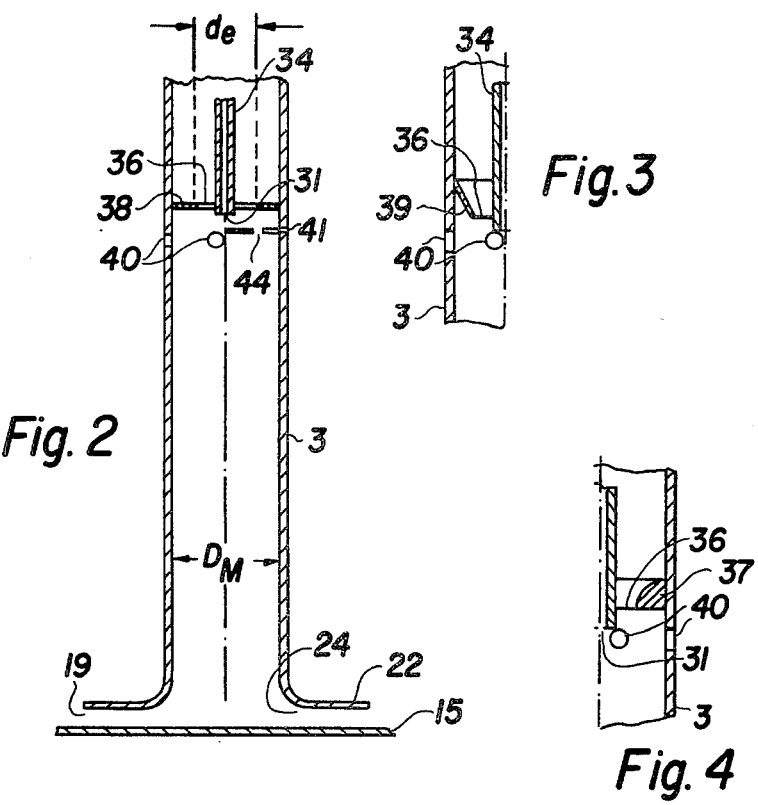
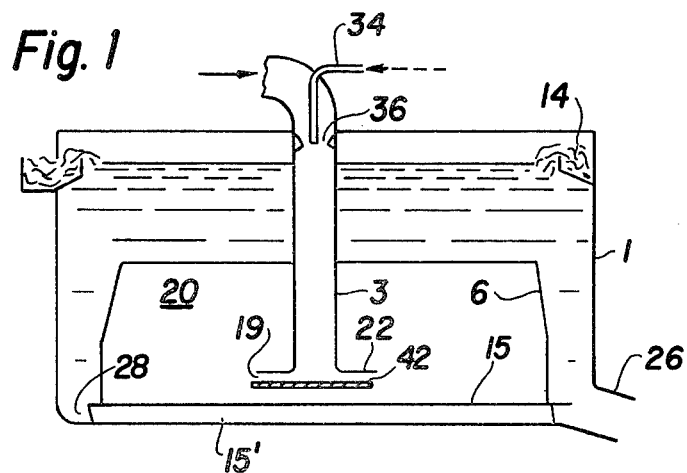

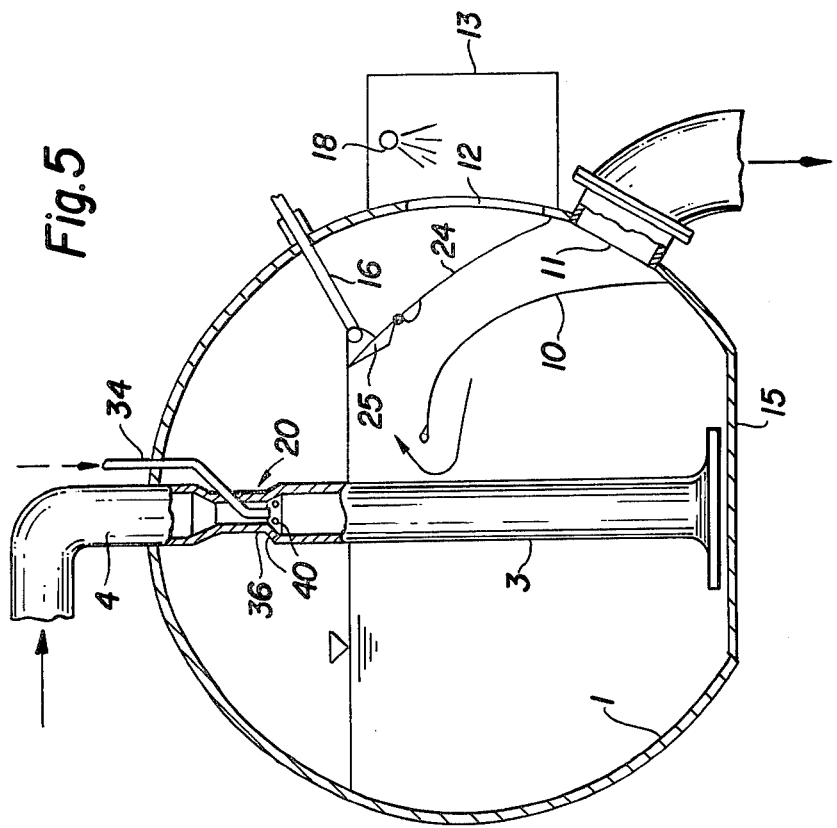

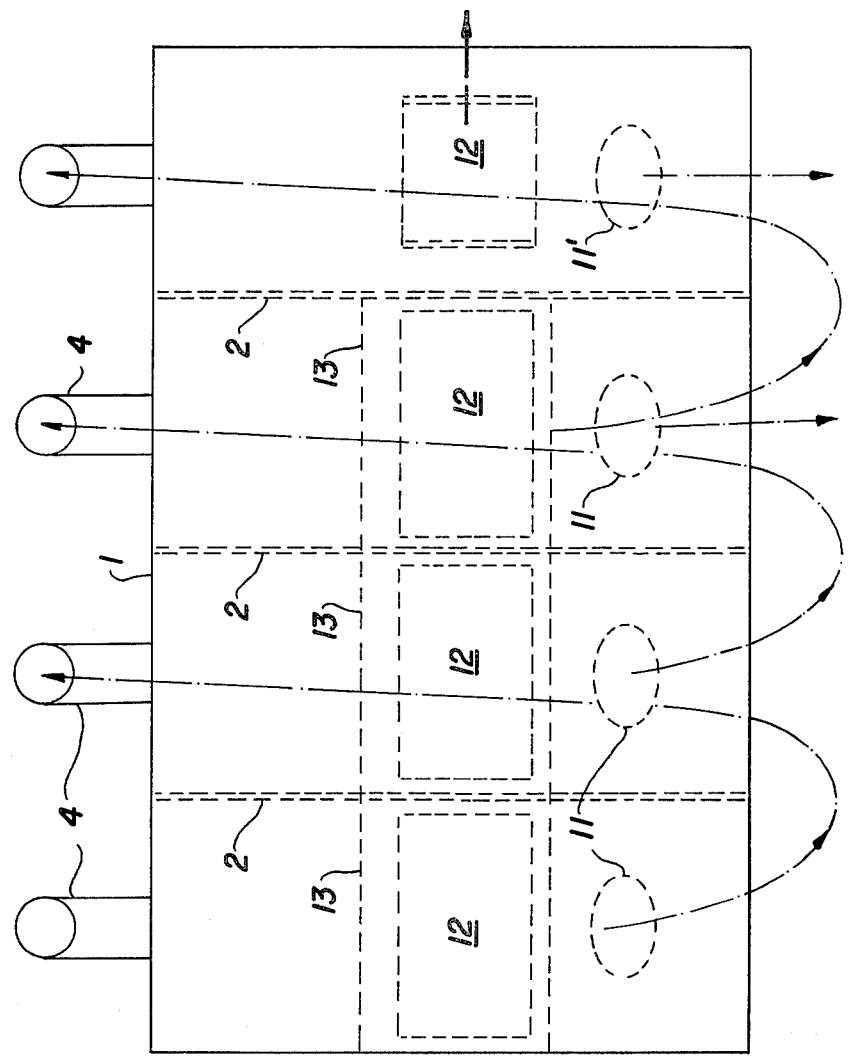

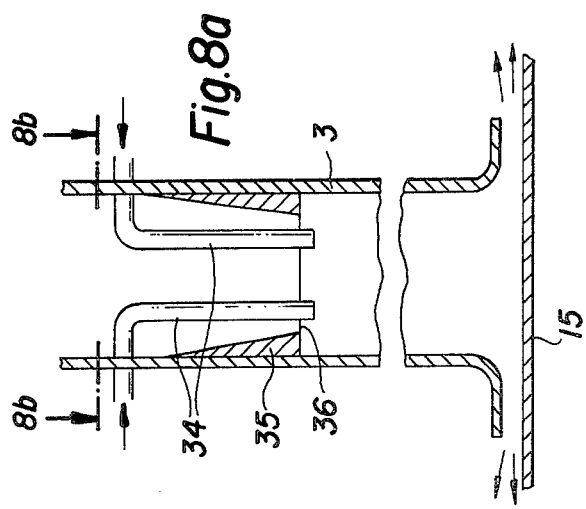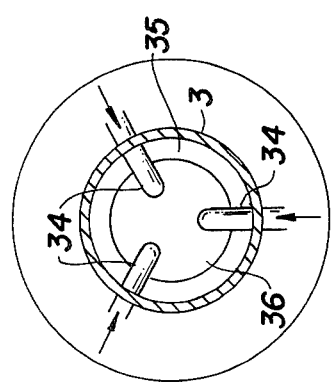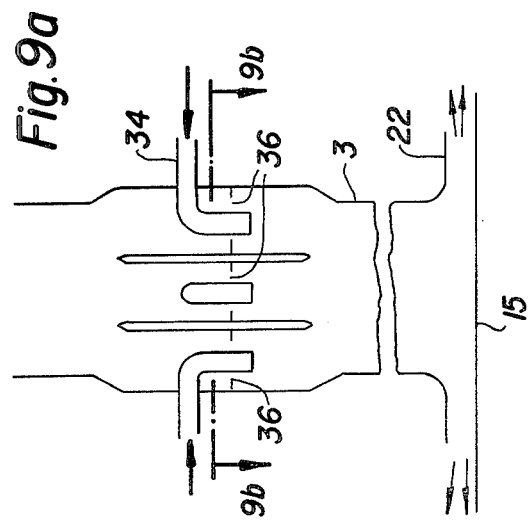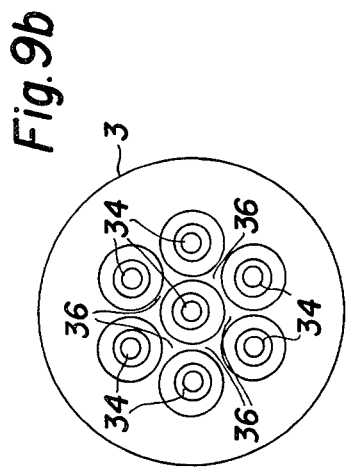

INJECTOR APPARATUS HAVING A CONSTRICTION IN A FOLLOWING ADJOINING MIXING PIPE

BACKGROUND OF THE INVENTION

The invention relates to an injector apparatus of the kind having a constriction at the beginning of a mixing section disposed in a mixing pipe, particularly for aerating suspensions for the flotation of solid matter contained therein.

An injector apparatus of this kind is disclosed in German Pat. No. 2,634,496. In this apparatus, suspension mixed with air is supplied to the flotation tank through an injector nozzle with a mixing pipe adjoining it in such a way that fine air bubbles are distributed through the suspension, bringing about a flotation effect. There is further disclosed in German Pat. No. 2,634,496, general-purpose injectors for aerating liquids wherein a drive jet of suspension is supplied to a mixing pipe through a nozzle. In this arrangement there is a deflecting element in the mixing pipe, specifically constructed as a body of rotation. In another version of the device as described in this German patent, the drive jet is distributed over a plurality of mixing sections which taper toward their outlet ends.

In another known arrangement according to Austrian Pat. No. 342,528, there is an injector with a Laval nozzle with a central air supply pipe opening into its narrowest point.

An object of the present invention is to provide an injector apparatus in which there is a high flow rate of air with economical power consumption, i.e., to produce a more efficient injector apparatus and a correspondingly more efficient flotation device.

According to the present invention, the injector apparatus of the kind referred to above is characterized in that the outlet of at least one central air supply pipe disposed substantially concentrically with the constriction is arranged a short distance after the constriction, and in that the outlet of the mixing pipe is constructed similarly to a radial diffusor.

The injector apparatus of the present invention is generally designed for the stream of liquid to be supplied perpendicularly from above to the liquid which is to be aerated, and for the air intake zone to lie above the level of the liquid in the flotation tank. This results in the following advantages: the essential structural length of the injector apparatus requires no additional lateral space, as would be the case if the injector apparatus were to be fitted along side, for example, in the bottom of the container; this arrangement perpendicularly from above is suitable for a large injector, as no high pressure increase due to change of momentum in the mixing pipe is necessary; and with this arrangement there is no necessity to overcome the hydrostatic pressure due to the height of the liquid in the tank, since the same head of liquid is present in the mixing pipe. The production of a corresponding pressure increase by change of momentum in the mixing pipe would require an uneconomically high flow speed in the nozzle. Moreover, only a small amount of the flow energy has to be reserved in order to achieve a distribution of the gas bubbles in the tank. The flow speed necessary for this depends on the geometry and the diameter of the tank being aerated.

Again, because of the perpendicular arrangement of the injector apparatus in the tank, the use of a so-called radial diffusor is advantageous; in this case, the radial diffusor displays better properties than the conical straight diffusor which would otherwise normally be used. In the radial diffusor having suitable geometry, a considerable reduction of the flow speed, and thus a high increase in pressure, can be achieved with a short structural length, and a high level of efficiency. In addition, desired radial flow and distribution of bubbles in the tank are produced thereby at the same time.

The amount of air sucked in is generally dependent on the flow speed at the narrowest point, thus in the nozzle or orifice, on the flow rate of suspension with the flow speed at the outlet from the mixing pipe, and also on the pressure prevailing there and on the geometry of the narrowest point, i.e., its diameter, and on that of the mixing pipe, and on the length of the latter.

BRIEF DESCRIPTION OF THE DRAWINGS

The above mentioned and other features and objects of the present invention, and the manner of attaining them, will become more apparent and the invention itself will be better understood by reference to the following description of an embodiment of the invention taken in conjunction with the accompanying drawings, wherein:

FIG. 1 is a schematic showing the basic principles of a flotation device using an injector apparatus according to the present invention;

FIG. 2 is an enlarged view of an injector apparatus according to the present invention;

FIGS. 3 and 4 each show alternate embodiments of a constriction in a mixing pipe;

FIG. 5 is a cross-section through a preferred embodiment of an injector apparatus in a cylindrical flotation tank having a compact, in-line construction;

FIG. 6 is a front elevational view of the embodiment of FIG. 5;

FIG. 8a is a longitudinal sectional view of a modified version of the injector apparatus;

FIG. 8b is a transverse sectional view of FIG. 8a;

FIG. 9a is a longitudinal sectional view of yet another modified version of the injector apparatus; and;

FIG. 9b is a transverse view of FIG. 9a.

DETAILED DESCRIPTION

Figure 7:
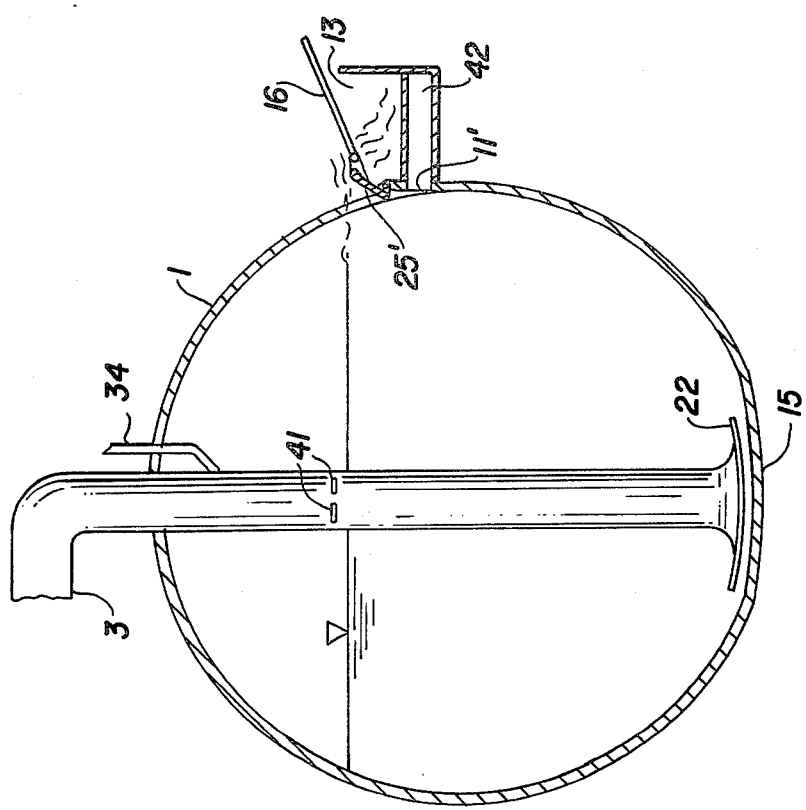
FIG. 7 shows an alternate embodiment of the present invention.

In FIG. 1, flotation tank 1 is shown as a substantially upright hollow cylinder, in the center of which a vertically extending mixing pipe 3, provided for the supply of the suspension, projects from above into the suspension. The removal of the cleaned suspension is effected via the annular extraction chamber 28, annular pipe 15', and extraction duct 26 in the base of flotation tank 1. The flotation froth is drawn off via annular trough 14. Mixing pipe 3 has a wider section at its outlet end, in the form of a radial diffusor which is defined radially on the outside by collar plate 22, which extends parallel to base 15 of flotation tank 1. The transition from mixing pipe 3 with a constant diameter to the outlet end is given by a radius which should be formed appropriately, for example, according to recommended values in the book by Bruno Eck, *Stromungslehre*, (*Flow Data*), 7th edition, 1966, under Section 44, pages 186-187 (after Ruchti), which book is incorporated by reference herein. The distance between collar plate 22 and base 15 or deflection plate 42 can also be found from the information therein. Generally, that distance is approximately 10% to 40% of the diameter of mixing pipe 3, and preferably approximately 15% to 20% thereof. Consideration should be given in the construction of using base 15 advantageously, as shown in FIG. 2, as a deflection plate or limiting wall for the radial diffusor, and not using, FIG. 1, a separate substantially flat plate 42, where there is a somewhat greater distance between collar plate 22 and base 15.

Dividing wall 6 divides the good stock extraction of chamber 28 from the actual flotation chamber 20. Dividing wall 6 deflects the flow and enhances the flotation effect, i.e., the rising up of the small air bubbles carrying particles of dirt. However, even without dividing wall 6, the same flow pattern is obtained if extraction chamber 28 is made radially narrow enough. Chamber 28 may then also be arranged further up, for example, immediately below froth trough 14.

In FIG. 2, constriction 36, which forms the air inlet point of the injector apparatus, is formed by orifice 38. Centrally extending air supply pipe 34 terminates, in the flow direction, some distance after orifice 38, i.e., after constriction 36. Here, a distance will preferably be chosen which is approximately equal to or less than half the diameter of constriction 36. Distances of 0.1 to 0.3 times the diameter of constriction 36 are preferable. Furthermore, there is an intake of air through radially outer air intake bores 40 in mixing pipe 3. Bores 40 also lie after constriction 36, in the direction of flow, at a distance which is less than the diameter of constriction 36. Instead of individual air intake bores 40, annular slits 41, which are interrupted only by small crosspieces 44, could also be provided, as shown in the right hand part of FIG. 2.

In FIGS. 8a and 8b, a modified version of the injector apparatus is shown, in which a plurality of central air pipes 34 pass into constriction 36 formed by nozzle 35 in mixing pipe 3. This may be advantageous with regard to the flow rate of air.

For the same reason, in FIGS. 9a and 9b, mixing pipe 3 is divided in the vicinity of constriction 36 into a plurality of parallel pipes with smaller diameters, each with a central air pipe 34. At any rate, the constriction 36 is of a construction opening downstream abruptly to the diameter of the mixing pipe 3, e.g. as orifice or sharply cut-off nozzle.

Other embodiments of constriction 36 can be seen in FIGS. 3 and 4. In FIG. 3, the orifice is shaped as funnel 39 which narrows down in the flow direction and forms constriction 36 at its outlet end. In FIG. 4, constriction 36 is formed by nozzle 37, this being a quarter-circle nozzle. A standard nozzle could also be used.

The shape of the cross-section of constriction 36 naturally affects the intake of air, but not the dispersion of air and the flotation effect. The diameter of constriction 36 should be chosen according to its design and, for the same flow speeds, the diameter is expediently always smaller when using nozzle 37 than when using screen 38. The ratio of the diameter $D_M$ of mixing pipe 3 to the diameter $d_e$ of constriction 36 lies preferably between approximately 1.2 and 1.8, and optimally at 1.6. Air intake pipe 34 has a relatively narrow diameter, which should amount at most to only a third of the diameter of constriction 36. The diameter of the total cross-section of air intake holes 40 or of air intake slit 41 should be chosen according to the amounts of air required, and the intake losses should be kept low by close dimensioning thereof. It is best if the total cross-section amounts to at most three times the cross-section of the air intake pipe 34. The best position for this is at a distance of at most one third of the diameter $D_M$ of mixing pipe 3, or equal to the diameter $d_e$ of constriction 36. The distance between the level of the liquid in flotation tank 1 and constriction 36 should be as small as possible in order to keep the energy consumption low. For this, it is best to have an arrangement wherein the surface of the liquid lies just below constriction 36. With suitable shaping, however, an arrangement is also possible with the surface of the liquid lying just above constriction point 36. With an arrangement like this, the energy consumption is kept very low. The flow energy must naturally be high enough to overcome the upwards directed force of the gas bubbles inside the head of liquid in mixing pipe 3, with an excess to cover the outflow energy required by the liquid. Further, that portion of mixing pipe 3 after constriction 36 in the direction of flow is of a length approximately four times the diameter of the portion immediately after constriction 36.

It has been found that with the arrangement according to the present invention, optimum values corresponding to the theoretical air intake values are possible. Furthermore, a relatively short period of dwell in flotation tank 1 is required here for the flotation, in order to achieve an optimum flotation effect, i.e., to obtain whitening of the pulp. Here, the nozzle speed, that is, the flow speed of the suspension at constriction 36, varies between 5 and 10 meters per second. A flow rate of up to 10,000 liters per minute is obtainable without difficulty.

The volume of air drawn in (l/s), amounts here to up to a third of the amount of the stream of suspension (m=meter, l=liter, s=second).

In small plants with a much lower flow rate than that indicated above, additional air intake openings 40 or 41 could also be omitted. In the large type of plant which is generally used, however, the considerably reduced flow rate of air would then prove detrimental.

According to FIGS. 5 and 6, the suspension is supplied to each flotation cell via feed pipe 4, with injector 20 interposed between feed pipe 4 and mixing pipe 3. Partition 10 improves the flotation effect, namely, the separation from the rest of the suspension of the particles of dirt which are to be floated away. The removal of the froth is also accelerated by this arrangement, so that a froth paddle device can be dispensed with. The extraction of froth is effected above gate 25, which can be adjusted by means of traction rods 16 via a drive which is not shown. After this, the froth passes through the froth extraction opening 12 into froth trough 13, in which spray nozzles 18 may be provided additionally. The extraction of the suspension is effected between partition 10 and dividing wall 24, through extraction opening 11, after which the suspension is supplied to injector 20 and mixing pipe 3 of the adjoining flotation cell (FIG. 6). A pump, which is not shown here, is provided each time for this purpose. The individual flotation tanks are combined here into a compact line-up in a single large tank.

In FIG. 7, another version is shown which is operated without partition 10 in FIG. 5, and wherein the extraction opening 11' for the cleaned suspension is formed as a slit immediately below the froth extraction gate 25', and leads into the extraction line 42 running immediately below froth trough 13.

The tank shown in FIGS. 5 to 7 has a virtually continuous circular cross-section.

In the embodiment shown in FIGS. 5 to 7, tank 1 with a substantially entirely circular shape is used. However, it is also equally possible to make the cross-section of tank 1 a horizontal oval. Similarly, particularly in the area above the suspension, a flat horizontal cover could be provided. Basically, it is a question of having the round shaping in the lower region in order to insure a design which will favor flow.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An injector apparatus for a flotation tank, comprising:
    a stationary mixing pipe for aerating suspensions for the flotation of solid matter contained therein and having therein a mixing section and a constricted opening at the beginning of said mixing section, said constricted opening terminating in the direction of flow in an abruptly diverging radially outward manner toward said mixing pipe, said mixing pipe having its outlet end portion diverging radially outwardly similar to a radial diffusor, and
    an air supply line means being substantially concentrically disposed in said constricted opening and having its outlet end opening disposed a short distance after said constricted opening in the direction of flow.

2. The apparatus of claim 1 wherein said mixing pipe has at least one air intake opening disposed therein a short distance after said constricted opening in the direction of flow.

3. The apparatus of claim 2 wherein said air intake opening in said mixing pipe is disposed therein a distance after said constricted opening of at most the length of the diameter of said constricted opening.

4. The apparatus of claim 2 wherein said air intake opening in said mixing pipe is disposed therein a distance after said constricted opening of at most one third the internal diameter of said mixing pipe.

5. The apparatus of claim 2 wherein said outlet end opening of said air supply line means is disposed after said constricted opening a distance between about 0.1 to 0.3 times the diameter of said constricted opening.

6. The apparatus of claim 1 wherein said outlet end opening of said air supply line means is disposed after said constricted opening a distance of at most one half the smallest diameter of said constricted opening.

7. The apparatus of claim 1 further comprising a flotation tank for containing suspension, and wherein said mixing pipe is generally perpendicularly disposed in said flotation tank, said constricted opening of said mixing pipe being disposed within the interior of said flotation tank.

8. The apparatus of claim 7 wherein said mixing pipe is disposed in said flotation tank to place said constricted opening approximately level with the top surface of the suspension in said flotation tank.

9. The apparatus of claim 1 wherein said constricted opening is formed by a nozzle means in said mixing pipe.

10. The apparatus of claim 9 wherein said nozzle means is a quarter-circle nozzle.

11. The apparatus of claim 1 wherein said constricted opening is formed by an annularly-shaped flange member in said mixing pipe.

12. The apparatus of claim 11 wherein said flange member converges radially inwardly and downwardly in the direction of flow in a funnel-like manner.

13. The apparatus of claim 1 wherein the portion of said mixing pipe after said constricted opening in the direction of flow is of a length of approximately four times the diameter of said portion immediately after said constricted opening.

14. The apparatus of claim 1 wherein the ratio of the diameter of said mixing pipe to the diameter of said constricted opening is approximately 1.2 to 1.8.

15. The apparatus of claim 1 further comprising a flotation tank having a bottom wall, and
    wherein said mixing pipe is disposed in said flotation tank and generally perpendicular to said bottom wall,
    said outlet end portion of said mixing pipe having a generally flat collar member connected to its remote end, said collar member being generally parallel to and spaced apart from said bottom wall, and
    further comprising a deflection plate disposed between and parallel to said collar member and said bottom wall,
    said collar member being upwardly disposed from said deflection plate a distance approximately 0.10 to 0.30 times the diameter of said mixing pipe.

16. The apparatus of claim 15 wherein said collar member is upwardly disposed from said deflection plate a distance approximately 0.10 to 0.21 times the diameter of said mixing pipe.

17. The apparatus of claim 1 further comprising a flotation tank having a bottom wall, and
    wherein said mixing pipe is disposed in said flotation tank and generally perpendicular to said bottom wall,
    said outlet end portion of said mixing pipe having a generally flat collar member connected to its remote end, said collar member being generally parallel to and spaced above said bottom wall a distance approximately 0.10 to 0.30 times the diameter of said mixing pipe.

18. The apparatus of claim 1 further comprising a flotation tank of upright cylindrical shape having a vertically disposed cylindrical side wall, and having disposed therein said mixing pipe for supplying suspension therein, said cylindrical side wall and said mixing pipe having therebetween an annularly-shaped extraction chamber for collecting the cleaned suspension.

19. The apparatus of claim 1 further comprising a flotation tank of reclining cylindrical shape having a horizontally disposed cylindrical side wall, said cylindrical side wall having a substantially circularly-shaped transverse cross-section in a vertical plane, and wherein said mixing pipe is vertically disposed from above into said flotation tank and substantially perpendicular to the horizontally disposed longitudinal axis of said flotation tank.

20. The apparatus of claim 19 further comprising extraction means disposed adjacent said cylindrical side wall, parallel to the longitudinal axis of said flotation tank, and in communication with the interior of said flotation tank for separating and removing the froth and cleaned suspension contained therein.

21. The apparatus of claim 20 wherein said extracting means includes a froth outlet in said cylindrical sidewall, and a wall member in said flotation tank joined to said cylindrical side wall below said froth outlet and extending upwardly therefrom toward the froth level, said wall member horizontally extending the length of said cylindrical side wall and having on its upper end portion a gate member vertically adjustable relative to the froth level, whereby said gate member may be vertically adjusted to allow the froth to pass therethrough and out said froth outlet, and a horizontally disposed slot substantially extending the length of said cylindrical side wall for the removal of the cleaned suspension, said slot being disposed subjacently said froth outlet.

22. The apparatus of claim 21 further comprising a partition member in said flotation tank joined to said cylindrical side wall below said slot and extending upwardly therefrom, said partition member horizontally extending the length of said cylindrical side wall and substantially parallel to the longitudinal axis of said flotation tank, the upper portion of said partition member curving inwardly towards the longitudinal axis to substantially separate said slot from the interior of said flotation tank.

* * * * *